US006585863B2

(12) United States Patent
Davydov et al.

(10) Patent No.: US 6,585,863 B2
(45) Date of Patent: Jul. 1, 2003

(54) PHOTOCATALYTIC DEGRADATION OF ORGANIC COMPOUNDS

(75) Inventors: Lev Davydov, N. Plainfield, NJ (US); Paul Amaat France, West Chester, OH (US); Panagiotis George Smirniotis, Cincinnati, OH (US)

(73) Assignee: Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/920,414

(22) Filed: Aug. 1, 2001

(65) Prior Publication Data

US 2002/0108846 A1 Aug. 15, 2002

Related U.S. Application Data

(60) Provisional application No. 60/223,761, filed on Aug. 8, 2000.

(51) Int. Cl.[7] .............................. B01D 53/00; C02F 1/48
(52) U.S. Cl. ................................ 204/157.3; 204/158.2; 210/748
(58) Field of Search ...................... 210/748; 204/157.3, 204/158.2

(56) References Cited

U.S. PATENT DOCUMENTS

| | | | |
|---|---|---|---|
| 2,882,244 A | 4/1959 | Milton et al. | 252/455 |
| 3,130,007 A | 4/1964 | Breck et al. | 23/113 |
| 3,216,789 A | 11/1965 | Breck et al. | 23/113 |
| 3,293,192 A | 12/1966 | Maher et al. | 252/430 |
| 3,308,069 A | 3/1967 | Wadlinger et al. | 252/455 |
| 3,354,077 A | 11/1967 | Hansford et al. | 208/111 |
| 3,375,065 A | 3/1968 | McDaniel et al. | 23/112 |
| 3,402,996 A | 9/1968 | Maher et al. | 23/112 |
| 3,415,736 A | 12/1968 | Ciric et al. | 208/111 |
| 3,442,795 A | 5/1969 | Kerr et al. | 208/120 |
| 3,449,070 A | 6/1969 | McDaniel et al. | 23/111 |
| 3,595,611 A | 7/1971 | McDaniel et al. | 23/111 |
| 3,702,886 A | 11/1972 | Argauer et al. | 423/328 |
| 3,709,979 A | 1/1973 | Chu et al. | 423/328 |
| 3,832,449 A | 8/1974 | Rosinski et al. | 423/328 |
| 4,016,245 A | 4/1977 | Plank et al. | 423/328 |
| 4,076,842 A | 2/1978 | Plank et al. | 423/328 |
| 4,220,567 A | 9/1980 | Kindervater et al. | 260/22 A |
| 4,440,871 A | 4/1984 | Lok et al. | 502/214 |
| 4,477,357 A | 10/1984 | Sittenfield | 210/748 |
| 4,556,477 A | 12/1985 | Dwyer | 208/111 |
| 4,640,829 A | 2/1987 | Rubin | 423/328 |
| 4,752,341 A | 6/1988 | Rock | 106/300 |
| 4,764,278 A | 8/1988 | Chou et al. | 210/634 |
| 4,874,433 A | 10/1989 | Kiss et al. | 106/450 |
| 4,962,239 A | 10/1990 | Bell et al. | 568/697 |
| 5,098,684 A | 3/1992 | Kresge et al. | 423/277 |
| 5,102,643 A | 4/1992 | Kresge et al. | 423/328 |
| 5,130,031 A * | 7/1992 | Johnston | 210/748 |
| 5,145,816 A | 9/1992 | Beck et al. | 502/60 |
| 5,236,575 A | 8/1993 | Bennett et al. | 208/146 |
| 5,250,282 A | 10/1993 | Kresge et al. | 423/705 |
| 5,264,203 A | 11/1993 | Beck et al. | 423/703 |
| 5,385,753 A | 1/1995 | Hu et al. | |
| 5,468,699 A | 11/1995 | Zhang et al. | |
| 5,580,461 A | 12/1996 | Cairns et al. | |
| 5,712,461 A | 1/1998 | Zhang et al. | |

FOREIGN PATENT DOCUMENTS

| | | |
|---|---|---|
| WO | WO 96/26903 | 9/1996 |
| WO | WO 96/26903 A1 * | 9/1996 |

OTHER PUBLICATIONS

Anpo et al., "Preparation of Zeolite Photocatalysts Containing Titanium Oxide or Vanadium Oxide and Photocatalytic Decomposition of NOx Over Them", Eco Industry (month unavailable, 1999), vol. 4, No. 5, pp. 11–19. Abstract only.*
Sierka et al. ("Catalytic Effects of Ultraviolet Light and/or Ultrasound on the Ozone Oxidation of Humic Acid and Trihalomethane Precursors", Ozone Sci. & Eng., (month unavailable, 1985), vol. 7, pp. 47–62).*
"A New Family of Mesoporous Molecular Sieves Prepared with Liquid Crystal Templates" Journal of American Chem. Soc.; vol. 114, Issue 27; pp. 10834–10843 Beck et al. 1992, Month unavail.
"Photodechlorination of PCB's in the Presence of Titanium Dioxide in Aqueous Suspensions" Dull Environ. Contam. Toxicol; vol. 16; pp. 697–701 Carey et al. 1976 Month Unavailable.
"Catalytic Effects of Ultraviolet Light and/or Ultrasound in the Ozone Oxiation of Humic Acid and Trihalomethane Precursors" Sierka et al. Month Unavailable, 1985.
Xu Y Langford Ch; "Enhanced Potoactivity of a Titanium (IV) Oxide supported on ZSM5 and Zeolite A at Low Coverage" The Journal of Physical Chemistry, American Chemical Society, vol. 99, 1995, pp. 11501–11507. Month unavailable.
Xu, Y. Langford Ch "Photoactivity of Titanium Dioxide Supported in MCM41, Zeolite X, and Zeolite Y", The Journal of Physical chemistry B, American Chemical Society, vol. 101, 1997, pp. 3115–3121. Month unavailable.
Theron P et al: "Degradation of Phenyltrifluoromethylketone in water by separate or simultaneous use of T102 photocatalysis and 30 or 515 KHZ Ultrasound", Physical Chemistry Chemical Physics, Royal Society of Chemistry, Cambridge, GB vol. 1, No. 19, Oct. 1, 1999 pp. 4663–4668.
Torimoto et al. "Effects of Adsorbents Used as Supports for Titanium Dioxide Loading on Photocatlaytic Degradation of Propyzamide", Environmental Science and Technology, American Chemical Society, vol. 30, 1996. Month unavailable.

* cited by examiner

*Primary Examiner*—Edna Wong
(74) *Attorney, Agent, or Firm*—C. Brant Cook; Kim W. Zerby; Steve W. Miller

(57) ABSTRACT

The present invention relates to the photocatalytic degradation of organic compounds by zeolite and/or mesoporous material hosted photocatalysts. The present invention further relates to a method of treating a contaminated aqueous liquid or gaseous fluid containing organics using a combination of visible or solar light energy in the presence of a photocatalyst to decompose the organic impurities in the liquid or gaseous fluid.

28 Claims, No Drawings

PHOTOCATALYTIC DEGRADATION OF ORGANIC COMPOUNDS

CROSS REFERENCE TO RELATED APPLICATIONS

This application claims benefit under 35 U.S.C. §119(e) to U.S. Provisional Application Serial No. 60/223,761, filed Aug. 8, 2000 (Attorney Docket No. 8197P&).

FIELD OF THE INVENTION

The present invention relates to the photocatalytic degradation of organic compounds by zeolite and/or mesoporous material hosted photocatalysts. The present invention further relates to a method of treating a contaminated aqueous liquid or gaseous fluid containing organics using a combination of visible or solar light energy in the presence of a photocatalyst to decompose the organic impurities in the liquid or gaseous fluid.

BACKGROUND OF THE INVENTION

Contaminated water is becoming a growing problem in many areas of the world. It is desirable to be able to efficiently and effectively remove such contamination (e.g. halogenated organic materials) from aqueous liquids such as water containing chlorinated hydrocarbons, e.g., chlorinated phenols. Prior art removal techniques have included the use of ultraviolet light radiation to decompose halogenated organic compounds. For example, Chou et al., U.S. Pat. No. 4,764,278, discloses a method for reducing the concentration of haloorganic compounds in water by first extracting the haloorganic compounds from the water using a water immiscible alkane hydrocarbon solvent. The solvent is then separated from the water and regenerated by exposing the solvent to ultraviolet light to degrade the haloorganic compounds.

Ultrasonic energy has also been used in the removal of halogenated organics from an aqueous liquid. For example, Sittenfield U.S. Pat. No. 4,477,357 describes a process for removal of contaminants such as halogenated organics from a liquid. Halogenated organic materials in oil or water are mixed with an equal amount of an alkaline agent, such as a hydroxide or a carbonate of an alkali metal or an alkaline earth metal, and then exposed to ultrasonic energy to decompose the halogenated organic contaminant. The presence of the alkaline agent is said to significantly accelerate the dehalogenation and decomposition of organic ring structures. U.S. Pat. No. 5,130,031 to Johnston also describes the treatment of aqueous liquids using light energy, ultrasonic energy and a photocatalyst. Sierka et al., in "Catalytic Effects Of Ultraviolet Light And/Or Ultrasound On The Ozone Oxidation Of Humic Acid and Trihalomethane Precursors", describe the catalytic effects of the use of both UV irradiation and ultrasound, either singly or in combination, on the ozone oxidation of organic materials, such as humic acid, in aqueous solutions. It is believed that the most effective reactor conditions for both the destruction of nonvolatile total organic carbon and trihalomethane formation potential utilized both ultrasound and UV irradiation in combination with ozone.

Another known technique of removing contaminants from fluids comprises the use of illuminated photocatalysts such as titanium dioxide. The ability of ultraviolet illuminated titanium dioxide to destroy organic contaminants in water (Carey et al., Dull. Environ. Contam. Toxicol. 16, 697, (1976)) has been well known for many years. However, heretofore, none of the prior processes has emerged as a commercially viable process. There are several reasons why these prior processes have not been commercially successful.

First, current evidence supports the notion that destruction of organic contaminants occurs on the surface of the photocatalyst, and therefore an increase in surface area is required for high rates of reaction. To achieve this, slurries of colloidal titanium dioxide have typically been used in many processes; however, the recovery of the colloidal photocatalyst in the discharged effluent has not been cost efficient for high volume applications.

Second, immobilization of titanium dioxide on a support within the photoreactor has been suggested and has resolved the retention problem described in the previous paragraph. However, this solution has come at the expense of increasing mass transfer problems associated with movement of the contaminants in water to the immobilizing support which was more distantly spaced (for light penetration purposes) than the dispersed colloidal particles. Immobilization also creates a lack of uniformity in irradiation of photocatalytic particles, which are immobilized at different distances and with different orientations to the light source. Larger photoreactors would therefore be needed to cope with the inefficiencies introduced by immobilization. With colloidal slurries (i.e. previous paragraph), mixing provided all particles with equal probability of being in low and high light intensity regions of the photoreactor.

Third, when treating dilute solutions, the resulting mass transfer problems reduce significantly the rate of chemical destruction in both the slurried and immobilized titanium dioxide processes described above.

Unfortunately, these problems serve to restrict the fluid volumes treatable by a given amount of photocatalyst in any given time, and necessitate the use of large reactors to handle large fluid volumes. Since many applications, such as municipal drinking water purification, require treatment of large volumes with low concentrations of contaminants, prior art processes involving the use of photocatalysts in this manner have been severely limited for such applications.

In light of the foregoing, it is desirable to have a process capable of purifying aqueous solutions while minimizing or eliminating the above-mentioned deficiencies of the prior art. Ideally, such a process would be useful to remove chemical contaminants from aqueous solutions in a relatively simple and efficient manner, and would decompose or transform the removed contaminants to dischargeable and innocuous or otherwise desirable products which could, at the discretion of the user, be diluted with purified fluid or captured for further processing such as microbial treatment. Further, it would be advantageous if such a process could be easily adapted for purifying liquid and/or gas phase fluids.

In recent years, advanced oxidation processes have emerged as potentially powerful methods of transforming organic pollutants in water or air into harmless substances. These methods are called advanced oxidation processes because they promote free radical reactions, which lead to complete oxidation of the organic compounds to yield $CO_2$, $H_2O$ and corresponding salts. In photocatalytic degradation the oxidizing species are generated from dissolved oxygen or from water, in situ, on the photocatalytic particles (i.e. $TiO_2$), which absorb light.

While these methods have been shown to be successful in removing organic contaminants from aqueous liquids and decomposing such organic materials, the reaction times are slow leading to reduced economic attractiveness of such processes, especially for continuous or on line treatment systems.

Accordingly, it is an object of the present invention to provide an efficient and cost effective method for degradation of organic compounds in aqueous systems.

SUMMARY OF THE INVENTION

The present invention relates to method for treating a liquid contaminated with organic compounds which method will rapidly decompose the organic contaminants. The method provided eliminates the need to provide ultraviolet light energy. The present method comprises exposing a contaminated liquid to visible light while contacting the contaminated liquid with a semiconductor photocatalyst, wherein the semiconductor photocatalyst comprises a transition metal atom exchanged into the framework of a zeolite and/or mesoporous molecular sieve material, which are subsequently loaded with a photoactive material, such as titanium dioxide.

DETAILED DESCRIPTION OF THE INVENTION

The present invention provides a novel process for efficiently removing organic compounds from contaminated aqueous liquids by contacting the contaminated liquid with a photocatalyst, while simultaneously exposing the contaminated liquid to visible light energy to decompose the organic compounds.

To be commercially feasible, photocatalytic degradation must be relatively inexpensive, safe, and use a nontoxic catalyst. The ideal method would produce no toxic by-products, utilize concentrated solar energy to reduce light energy costs, exhibit high yields, and be applicable to a wide variety of organics. It has been discovered that when photocatalytic degradation using a zeolite or other microporous molecular sieve, which has had a transition metal exchanged into its framework and then is loaded with titanium dioxide, in accordance with the present invention, the result is substantially higher degradation rates and the elimination of the need for UV light. The disclosed process has the potential to offer both improved rates and efficiencies (hence throughputs) under optimized conditions; the ability to use impure or cheaper forms of the photocatalyst; significantly increased degradation rates of aqueous organics without poisoning of the catalyst; improvements in conventional suspended catalyst separation methods such as ultrafiltration; and for applications involving treatment of waste water containing suspended solids, the use of sonication may also assist in the release of hydrophobic organics adsorbed on soil particles, for subsequent reaction at the photocatalyst surface.

The use of molecular sieves such as zeolites and mesoporous materials as support structures for transition metals is beneficial for many reasons. First, the well-defined porous structures (large surface area) of zeolites offer a special environment for the incorporation of transition metals, with unusual morphologies and thus altered photoactivity. Second, they allow pre-concentration of non-polar organic molecules and selective adsorption onto a zeolite. Third, zeolites enhance catalytic activity through properties ranging from surface acidity to reactive intermediate stabilization. Fourth, zeolites are believed to not scatter photons as strongly as $TiO_2$ does. Fifth, transition metal ions exchanged into zeolites and mesoporous materials, create a narrow energy band inside the materials band gap.

Additionally, the materials with mesoporous character offer one other advantage when used in accordance with the present invention. The uniform one-dimensional mesopores such as those of MCM41 allow faster diffusion of oxygen, reactive species and organic substrates within the catalyst surface than the microporous zeolites.

Photocatalyst

By use of the term "photocatalyst" is meant any compound in which irradiation of such compound with electromagnetic radiation of visible wavelength will result in the generation of conduction band electrons ($e_{cb}^-$) and valence band holes ($h^+_{vb}$) that can then undergo oxidation reactions at the catalyst surface with species such as water or inorganic and organic compounds. The initiating step in this photocatalytic process requires illumination with light of energy higher than the band gap of the semiconductor photocatalyst (e.g., <380 nm. for anatase $TiO_2$, the most effective and widely studied photocatalyst). Electromagnetic radiation within a wavelength range of from about 250 nanometers (nm) to about 450 nm will usually have such an energy level.

The preferred photocatalyst is a zeolite or other mesoporous molecular sieve material that has had a transition metal exchanged into it and then is subsequently loaded with $TiO_2$. Transition metals with unfilled d-levels are preferred. Using the rules of semiconductor doping, these are the transition metals capable of having a stable oxidation state one unit lower or one unit higher, than the host semiconductor. Thus, for $TiO_2$ (oxidation state of titanium +4) the dopants capable of having stable +5 or +3 oxidation states are prefered but not required. Doping the catalyst with a transition metal creates a narrow energy band within the original band gap allowing for the generation of holes in the valence band and electrons in the conduction band, which are required for photocatalytic oxidation. Suitable transition metals include but are not limited to chromium, iron, nickel, manganese, copper, tungsten, cobalt, molybdenum, ruthenium, vanadium, zinc, silver, platinum, titanium and mixtures thereof.

The oxidation state of the metal is selected as desired by the formulator, for example manganese in the 0, +2, +3, +4, +5, +7 state, iron in the 0, +2, +3, +4, +5 state, vanadium in the 0, +2, +3, +4,+5 state, etc. The oxidative state of the large pore size mesoporous material catalyst may change during use consistent with its nature as an oxidative material.

These may be provided in a wide distribution of average particle sizes ranging from an average particle size of as small as, for example, from about 0.05 microns to as large as, for example, about 1,000 microns in diameter. Since large surface areas are desired for the photocatalyst to provide a large amount of active sites, small particles will be desired. It will be appreciated, however, that larger size particles could be used, i.e., particles larger than 1,000 micron in size. The particulate photocatalyst, such as chromium exchanged zeolite, may be added in dry form to the contaminated liquid and mixed together to form a suspension prior to exposure of the contaminated liquid to light energy. Alternatively, the dry particulate catalyst may be premixed as a slurry or suspension with an aqueous liquid miscible with the contaminated liquid, and this premix may then be added to the contaminated liquid prior to exposure of the contaminated liquid to light energy.

Typical zeolites and mesoporous materials include the commercially available ZSM-4 (Omega), ZSM-5, ZSM-11, ZSM-12, ZSM-20, ZSM-22, ZSM-23, ZSM-35, ZSM-48, ZSM-50, MCM-22, PSH-3, MCM-48, MCM-49, Beta, X, Y, and L, as well as ferrierite, mordenite, dachiardite, clinoptilolite, offretite, erionite, gmelinite, chabazite, etc. Other molecular sieves contemplated include, for example, MCM-9, VPI-5, MCM-20, SAPO-11, SAPO-17, SAPO-34, SAPO-37, MCM-36, MCM-41, MCM-48, MCM-49 and MCM-53.

Also included within the definition of the useful molecular sieves are crystalline porous silicoaluminophosphates such as those disclosed in U.S. Pat. No. 4,440,871, the catalytic behavior of which is similar to that of the aluminosilicate zeolites. Zeolite Beta is described in U.S. Pat. No. Re. 28,341 (of original U.S. Pat. No. 3,308,069), to which reference is made for details of this catalyst.

Zeolite X is described in U.S. Pat. No. 2,882,244, to which reference is made for the details of this catalyst. Zeolite L is described in U.S. Pat. No. 3,216,789, to which reference is made for the details of this catalyst. Zeolite Y is described in U.S. Pat. No. 3,130,007, to which reference is made for details of this catalyst. Low sodium ultrastable zeolite Y (USY) is described in U.S. Pat. Nos. 3,293,192; 3,354,077; 3,375,065; 3,402,996; 3,449,070; and 3,595,611, to which reference is made for details of this catalyst. Dealuminized zeolite Y can be prepared by the method disclosed in U.S. Pat. No. 3,442,795, to which reference is made for details of this catalyst. Zeolite ZSM-3 is described in U.S. Pat. No. 3,415,736, to which reference is made for details of this catalyst. Zeolite ZSM-5 is described in U.S. Pat. No. Re. 29,948 (of original U.S. Pat. No. 3,702,886), to which reference is made for details of this catalyst. Zeolite ZSM-11 is described in U.S. Pat. No. 3,709,979, to which reference is made for the details of this catalyst. Zeolite ZSM-12 is described in U.S. Pat. No. 3,832,449, to which reference is made for the details of this catalyst. Zeolite ZSM-20 is described in U.S. Pat. No. 3,972,983, to which reference is made for the details of this catalyst. Zeolite ZSM-22 is described in U.S. Pat. No. 4,556,477, to which reference is made for the details of this catalyst. Zeolite ZSM-23 is described in U.S. Pat. No. 4,076,842, to which reference is made for the details of this catalyst. Zeolite ZSM-35 is described in U.S. Pat. No. 4,016,245, to which reference is made for the details of this catalyst. Zeolite ZSM-50 is described in U.S. Pat. No. 4,640,829, to which reference is made for details of this catalyst. U.S. Pat. No. 4,962,239 to which reference is made above is incorporated herein by reference in its entirety. This patent teaches a process for preparing ethers over catalyst comprising a particular class of zeolites, e.g., MCM-22 and PSH-3. MCM-36 is described in U.S. Ser. No. 07/811,360, filed Dec. 20, 1991, now U.S. Pat. No. 5,25,277, and is incorporated herein by reference in its entirety. MCM-41 is described in U.S. Pat. No. 5,098,684, to which reference is made for the details of this catalyst. MCM-49 is described in U.S. Pat. No. 5,236,575, and is incorporated herein by reference in its entirety.

Zeolite Catalysts

The zeolite particles useful herein are particles of a crystalline aluminosilicate corresponding to the formula: $((xM_{2/n}O)(Al_2O_3)(ySiO_2)) \cdot zH_2O$ in which M is a cation, generally an ammonium or metal cation, commonly a mono- or divalent metal cation (e.g. a sodium, potassium, or other alkali metal cation, or another cation such as calcium or magnesium); n is the valence of the cation; x is the coefficient of the metal oxide; y is the coefficient of the silica; and z in the number of molecules of water of hydration. They are preferably zeolites having a particle size of 0.1–20 $\mu$m (e.g., 2–5 $\mu$m) and a $SiO_2/Al_2O_3$ molecular ratio of less than or equal to 14, more preferably a zeolite A, zeolite C, zeolite X, or zeolite Y, most preferably a zeolite Y.

This invention relates to zeolite compositions topologically related to prior known zeolites but which are characterized as containing framework atoms of a transition metal, and preferably having a very low content of defect sites in the structure. Accordingly, one embodiment of the invention is a molecular sieve composition having a three-dimensional microporous framework structure of $Al_2O_3$, $SiO_2$, $TiO_2$ tetrahedral oxide units and having a unit empirical formula on an anhydrous basis of $(Ti_wAl_xSi_y)O_2$ wherein w, x and y represent one of the mole fractions of Ti, Al and Si, respectively, present as framework tetrahedral oxide units. These molecular sieves can be prepared by contacting a starting zeolite with a solution or slurry of a fluoro salt of a transition metal under effective process conditions to extract aluminum from the zeolite framework and substitute for it the transition metal.

Mesoporous Material Catalysts

As used herein, the term "large pore size mesoporous material catalysts" means any porous material having a mean pore size of greater than about 15 Angstroms and having oxidative catalytic properties resulting at least in part from the presence of metal bound to (under typical use conditions of the present invention compositions) the large pore size crystalline material. Preferred are oxidative catalysts.

The transition metal may therefore be present in the catalyst by physical interactions with the porous material, by ionic or covalent bonding, or by clusters of metals likewise bound or attached to the porous material.

The transition metal may be incorporated into the catalyst by adsorbing it as an aqueous cation, with or without simple ligands such as acetate. The transition metal may also be incorporated by adsorbing it as a volatile, low-valent metal carbonyl, with or without post-treatment to decarbonylate the adsorbed metal carbonyl in-situ.

Methods for attaching metals to porous materials, and attaching functional groups to porous materials to which metals may thereto be attached, are known in the art, being described for example in U.S. Pat. No. 5,145,816, issued Sep. 8, 1992 to Beck et al., and in "A New Family of Mesoporous Molecular Sieves Prepared with Liquid Crystal Templates", by Beck et al, *J. Am. Chem. Soc.*, Vol. 114, No. 27, pp. 10834–10843 (1992), incorporated by reference herein in their entirety.

Preferred large pore size mesoporous material catalysts useful herein have mean pore size of about 20 Angstroms or greater, more preferably of about 100–1000 Angstroms, and most preferably about 500–600 Angstroms. Also, preferred mesoporous material catalysts herein have surface area of at least about 300 m$^2$/g, more preferably at least about 400 m$^2$/g and most preferred being at least about 500 m$^2$/g.

Preferred large pore size mesoporous material catalysts are silicate or aluminosilicate catalyst materials. These include liquid crystal template synthesized silicate and aluminosilicate materials, such as those described in "A New Family of Mesoporous Molecular Sieves Prepared with Liquid Crystal Templates", by Beck et al, *J. Am. Chem. Soc.*, Vol. 114, No. 27, pp. 10834–10843 (1992). These materials are additionally characterized by high crystallinity and low water solubility. Most preferred are such materials, which are crystalline on the basis of X-ray powder pattern.

Methods for evaluating the physical characteristics of the catalysts useful herein are well known in the art, being described for example in Kirk-Othmer Encyclopedia of Chemical Technology, Fourth Edition, Vol. 5, pp. 383–418 (1993), the disclosures therein being incorporated herein by reference in their entirety.

Highly preferred are those catalysts described as "mesoporous molecular sieve" materials as taught, for example, in U.S. Pat. No. 5,102,643, issued Apr. 7, 1992 to Kresge et al., U.S. Pat. No. 5,250,282, issued Oct. 5, 1993 to Kresge et al., U.S. Pat. No. 5,264,203, issued Nov. 30, 1993 to Beck et al., U.S. Pat. No. 5,145,816, issued Sep. 8, 1992 to Beck et al., and U.S. Pat. No. 5,098,684, issued Mar. 24, 1992 to Kresge et al., the disclosures of all these patents being incorporated herein by reference in their entirety.

One particularly preferred mesoporous material is MCM-41. MCM-41 refers to a mesoporous material with a hexagonal silicate phase MCM-41 can be successfully synthesized using the method described by A. Sayari et al. (Chemistry Materials, 9, 1997).

Exchange of Transition Metal Atoms for Al Atoms

Transition metal atoms, such as chromium or iron can be effectively "exchanged" with the aluminum atoms of the zeolite or mesoporous material framework. The zeolite powders already contain aluminum, and the mesoporous material is synthesized (described below) to contain aluminum. The cation exchange is performed by use of salts of weak organic acids and corresponding transition metals in a slurry formed with each zeolite or mesoporous material and distilled water. Chromium acetate, ammonium-titanium oxalate and vanadium oxalate can serve as examples of such salts. The slurry is vigorously agitated at ambient temperature for approximately 10 hours. The catalyst is then filtered using conventional filter paper and washed thoroughly with distilled water. Other titanium salts can be used for this as long as they do not result in the formation of a very acidic environment or the destruction of the zeolite or mesoporous molecular material itself. It will be understood by one of skill in the art, that the size of the precursor used must be smaller than the pore openings of the zeolite or mesoporous molecular material.

There are a number of analytical techniques known in the art, which can be used to confirm that the transition metal has been successfully exchanged into the zeolite or mesoporous material. These techniques include: extended X-ray absorption of fine structure (EXAFS), Raman infrared spectroscopy and high resolution transmission electron microscopy.

It should be understood by one of skill in the art that to achieve a photocatalyst containing a transition metal it is not required that one start with an aluminum containing framework. That is to say that the photocatalyst can be synthesized to incorporate the transition metals in the framework from the very beginning.

Loading with $TiO_2$

Titania is loaded into the pores of zeolites or mesoporous molecular materials such as USY and MCM-41 after a transition metal or titanium has been exchanged into the framework or incorporated into the framework during synthesis. This is also commonly referred to as doping of the materials with titania. A slurry of each zeolite or other mesoporous molecular material is formed and 0.5–50% of precursor is added to result in the desired titania loading. Typically the amount of titania loaded is less than 25% by weight of the catalyst to avoid blocking of the pores. Higher concentrations may be used but are not deemed to be necessary and would add expense to the process in terms of material costs. The precursor used to load the zeolites is ammonium-titanium oxalate and the precursor for the mesoporous molecular material is titanium-isopropoxide. Other titanium salts can be used for this as long as they do not result in the formation of a very acidic environment or the destruction of the zeolite or mesoporous molecular material itself. It will be understood by one of skill in the art, that the size of the precursor used must be smaller than the pore openings of the zeolite or mesoporous molecular material.

The concentration of the particulate photocatalyst in the contaminated liquid should range from about 100 milligrams per liter of contaminated liquid to about 2 grams per liter of contaminated liquid. Higher concentrations may be used but are not deemed to be necessary and only would add expense to the process, both from the standpoint of additional material costs as well as additional processing costs, e.g., if the catalyst must be separated from the purified liquid after the organic compound has been decomposed. Typically, the concentration of the photocatalyst in the contaminated liquid will be about 1 gram per liter. Lower concentrations may be used, but this may result in a lowering of the decomposition rate. In this regard, it will be appreciated that the actual amount of catalyst used will depend upon the surface area of the catalyst, which will, in turn, depend upon the porosity and/or particle size of the particulate catalyst. A typical surface area range will be from about 1 to about 1000 $meter^2/gram$ of photocatalyst such as for example titanium exchanged USY zeolites.

Zeolite Membranes

Generally speaking, in accordance with the invention, methods are provided for forming membranes of semiconductive materials loaded molecular sieve materials, such as zeolites, having a transition metal atom exchanged therein. The semiconductors, such as metal oxides, are photoactive and are useful in photocatalytic reactions. Methods for forming the membranes can involve sol gel techniques and surface reaction techniques. An example of such a membrane is titanium oxide-loaded zeolite molecular sieve, which has a transition metal atom exchanged therein. Photoactive semiconductors suitable for use herein include titanium dioxide, zinc oxide, cadmium sulfide, iron oxide, gallium phosphide, tin oxide, silicon carbide, tungsten oxide, and mixtures thereof. Membranes in accordance with the invention can be used to perform useful chemical reactions such as the mineralization of organic chemicals in the presence of light. For example, many toxic organic chemicals can be converted to useful or benign products by contacting those chemicals with active metal oxide-molecular sieve membranes in accordance with the invention and illuminating the membranes with light of a suitable wavelength. An object of the invention is to increase the photoefficiency of conventional membranes. It has been discovered that the quantum yield of $TiO_2$ photocatalyzed reactions can be markedly increased by combining the $TiO_2$ material with a molecular sieve in the form of a membrane while exposing to light energy during the reaction. Methods for forming membranes of semiconductive material incorporating molecular sieve material can be found in U.S. Pat. No. 5,712,461.

Aerogels Transition metals such as chromium can be easily incorporated into low-density nanoscale mesoporous aerogels. Aerogels are a class of materials composed of about 10 nm particles connected in a highly porous (80–90% by volume), three-dimensional network. Because aerogels provide both high surface area (up to 1000 $m^2/g$) and highly open space, they are well suited to catalytic applications. Especially composite aerogels lend themselves towards the formation of titania aerogels. Morris et. al., in Science, vol. 284, pp. 622–624, 1999, describes the efficient illumination of aerogel-incorporated titanium, because the silica aerogel is transparent throughout most of the ultraviolet-visible region.

Light Source

As stated above, the radiation source should be a light source, which provides energy higher than the band gap of the semiconductor catalyst. To accomplish this, the electromagnetic radiation or light source will be within the visible wavelength range of from about 380 nm to about 750 nm, which is considerably broader than the range for conventionally used anatase titania (UV radiation from about 250 to about 380 nm). The intensity of the light source will be inversely proportional to the amount of time which it will takes to affect the desired decomposition of the organic compounds, i.e., the weaker the light source, the longer the decomposition time will be. This, in turn, will affect the overall efficiency of the process and will be of particular importance when the process is being run on a continuous basis rather than as a batch operation.

A number of zeolite- and mesoporous materials hosted photocatalysts have been synthesized and have shown a remarkable shift of the absorption spectrum towards the visible range of the light spectrum. Transition metal exchanged zeolites and mesoporous materials, especially those containing Iron or Chromium, can utilize visible light energy, as it has been surprisingly found that their absorbency at 452 nm is greater than 50%. Not wishing to be bound by theory it is believed that the transition metals create additional energy levels in the band gaps of the semiconductors due to unfilled d-orbitals present in the transition metals. This eliminates the necessity for a UV light source and renders solar or visible light capable of activating the photocatalyst, resulting in a substantial cost saving.

For a light source which is coupled directly to an optical cell containing the contaminated liquid, the intensity of the light source, at the selected wavelength should be at least about 1,000 microwatts per inch$^2$ of exposure area per liter of liquid to achieve complete decomposition within a reasonable exposure period. Such light sources are commercially available, e.g., a Quartz-Halogen Tungsten lamp source, fluorescent lamp or sunlight may be used as the source of short wave length light radiation. The distance that the light source is located from the liquid to be irradiated is important since much of the light energy may be absorbed within a few cm. of the liquid surface. Therefore, depending upon the size and geometry of the reaction vessel, as well as the intensity of the light source, it may be appropriate to use a plurality of such light sources dispersed around the perimeter of the vessel, as well as above and below the respective top and bottom surfaces of the vessel.

In general, it may be stated that the relationship of the intensity of the light source (or sources) to the dimensions of the reaction vessel should be such that the light entering the reaction vessel will still have sufficient intensity or energy to initiate photocatalytic decomposition of the organic material in the liquid when it reaches the farthest extremity of the volume of the vessel. For a single light source, for example, this would mean the opposite wall of the vessel. However, if a plurality of such light sources were to be spaced around the perimeter of the reaction vessel, this distance would mean the distance to the center of the vessel.

It should be noted in this regard that the decomposition rate will be dependent upon not only the intensity of the light source and the dimensions of the reaction vessel, but also on the type and concentration of catalyst, and the type and concentration of the organic material being decomposed.

The light source needs not be constant. It is possible to provide a modulated or pulsed light to achieve the same efficiency of degradation. For example, the light is generated in a modulated or pulsed manner, which includes subsequent time-on and time-off intervals. The modulated or pulsed light may have a duty cycle, wherein the ratio of the light time to the total time of the cycle ranges from 5% to 50% and the light time is less than one second. In one embodiment, the light time is less than 500 milliseconds, and in another embodiment, the light time is less than 100 milliseconds.

Types of Organic Compounds Degraded

All types of organic compounds can be cleaned from contaminated liquids by use of the present invention. The type and size of the compound to be removed from the liquid will determine the pore size of the catalyst that should be used. The organic compounds present in the contaminated liquid to be purified may comprise halogenated compounds such as, chlorinated phenols (e.g., 2,4-dichlorophenol, 4-chlorophenol, pentachlorophenol), chlorinated biphenyls (e.g., 3-chlorobiphenyl and 4,4'-dichlorophenyl), brominated biphenyls, and halogenated benzene derivatives (e.g., chlorobenzene, 4-chlorotoluene, chlorinated dioxin, and halogenated benzofurans). Examples of halogenated aliphatic organics include halogenated hydrocarbons such as fluoromethanes, ethanes, propanes, etc.; chloromethanes, ethanes, propanes, etc.; bromomethanes, ethanes, propanes, etc.; and mixtures of same; halogenated alkenes, such as trichloroethylene; halogenated alcohols, such as 1-chloro-2-propanol; halogenated ketones; halogenated aldehydes, such as aldrin aldehyde; halogenated carboxylic acids, such as trichloroacetic acid; and halogenated ethers, such as bis(2-chloroisopropyl)ether. Other organic compounds which can effectively be removed from contaminated liquids include, but are not limited to, aromatics and polyaromatics, paraffins, olefins, ketones, aldehydes, organic acids and alcohols. A representative, but non-exhaustive listing, of different kinds and types of organic material able to be degraded is provided by Table I below.

TABLE I

ALKANES AND THEIR DERIVATIVES

Straight Chain Alkanes (such as octane, decane, and hexadecane)
Branched Chain Alkanes (such as isooctanes)
Cycloalkanes (such as cyclohexane)
ARENES AND THEIR DERIVATIVES Benzene
Alkylbenzenes (such as toluene and xylenes)
Phenol
Oxygen Substituted and Carbon Substituted Alkylphenols
Aniline
Nitrogen Substituted and Carbon Substituted Alkylanilines
Catechol
Oxygen Substituted and Carbon Substituted Alkylcatechols
Resorcinol
Oxygen Substituted and Carbon Substituted Alkylresorcinols
Cresols
Oxygen Substituted and Carbon Substituted Alkylcresols
Hydroquinone
Oxygen Substituted and Carbon Substituted Alkylhydroquinones
Benzyl Chloride
Alkylbenzyl Chlorides
Chlorobenzenes
Alkylchlorobenzenes
Dichlorobenzenes
Alkyldichlorobenzenes
Polychlorobenzenes
Polychloroalkylbenzenes
Nitrobenzene
Alkylnitrobenzenes
Dinitrotoluenes
Chlorophenols
Oxygen Substituted and Carbon Substituted Alkylchlorophenols
Polychlorophenols
Oxygen Substituted and Carbon Substituted Alkylpolychlorophenols
Diphenylethylene
Stilbenes
Naphthalene
Chloronaphthalenes
Alkylnaphthalenes
Naphthols
Oxygen Substituted and Carbon Substituted Alkylnaphthols
Chloronaphthols TABLE I-continued Benzoic Acid
Oxygen Substituted and Carbon Substituted Alkylbenzoic Acids
Salicylic Acid
Oxygen Substituted and Carbon Substituted Alkylsalicyclic Acids
Chlorobiphenyls
Dichlorobiphenyls
Polychlorobiphenyls
Ring-Chlorinated Phenylacetic Acids
Dichlorodiphenyltrichloroethane (DDT)
OLEFINS AND UNSATURATED HALIDES Simple Alkenes
Alkadienes
Vinyl Chloride
Vinyl Bromide
Dichloroethylenes
Trichloroethylene
Tetrachloroethylene
ALKYLHALIDES Dichloroethanes and Dibromoethanes
Trichloroethanes and Tribromoethanes
Tetrachloroethanes and Tetrabromoethanes
$CFCl_3$, $CF_2 Cl_2$, and Other Chlorofluorocarbons
Methyl Chloride and Methyl Bromide
Methylene Dichloride and Methylene Dibromide
Chloroform and Bromoform
Carbon Tetrachloride and Carbon Tetrabromide
EXAMPLES OF OTHER CLASSES Chlorinated Dioxins
Chlorinated Dibenzofurans
Trichloroacetic Acid
Alkyl and Aryl Thiocarbamates
Alkyl and Aryl Amines
Alkyl and Aryl Mercaptans
Alkyl and Aryl Thioethers
Polymeric Materials Related to Any or All of the Above Classes A cursory reading of Table I will reveal many classes of substances whose members have been classified as toxic, environmentally hazardous compositions by federal and state agencies such as the EPA, OSHA, and NIOSH. In addition, many of these substances are known or believed to be carcinogenic or carcinogen-promoters whose use is carefully controlled by various health and safety agencies. All of these comprise the membership of the general class of organic material able to be completely degraded into environmentally safe reaction products comprising at least carbon dioxide.

The concentration of such organic compounds in the aqueous liquid may range from as little as 2 ppm, to as much as 2,000 ppm. After purification by the process of the invention, the concentration of such organic impurities in the previously contaminated liquid may be reduced to less than 1.0 ppm. Exposure of the contaminated aqueous liquid containing such organic compounds to visible light radiation energy, in the presence of the particulate catalyst, results in decomposition of the organic compounds into purified liquid, environmentally compatible reaction products comprising at least carbon dioxide which may then be subsequently removed from the liquid. A separate source of oxygen is usually not necessary for the formation of the $CO_2$ decomposition product, since there will normally be sufficient dissolved oxygen in the aqueous liquid. However, a separate source of oxygen (e.g. ozone, $H_2O_2$) may be optionally provided if desired, which could be introduced into the contaminated liquid through a sparger ring or the like. Although not required, ultrasonic energy can be added to the process to further enhance its efficiency.

Process

A contaminated liquid or gaseous source such as water containing halogenated organic contaminants, in a concentration which may range from about 2 ppm to about 2,000 ppm, is mixed with a source of particulate catalyst which may be in dry form or, preferably, in a previously formed suspension or slurry. The optical cell may comprise any reaction vessel having sidewalls (or one or more openings in the sidewalls) transparent to visible light, to permit the liquid in optical cell to be irradiated by light energy from a light source, which is preferably coupled directly to the sidewall of the cell to permit the most efficient coupling of the light energy to the cell from the source. While the light source has been described as a single source, it will be readily appreciated that the light energy may be passed through the transparent sidewalls or windows through a plurality of such light sources arranged around the periphery of the optical cell, as previously discussed, to uniformly illuminate the liquid therein with light of the proper wavelength during the decomposition of the organic compounds in the contaminated liquid in cell.

The optical cell may be further provided with temperature controlling means to maintain the liquid being treated within the cell within a temperature range of from about 15° C. to about 60° C. Pressure control means may also be provided to increase the hydrostatic pressure within the cell from sub-atmospheric pressure up to a pressure of about 500 psi. The organic compounds in the aqueous liquid decompose in the optical cell upon exposure to the light radiation in the presence of the particulate photocatalyst. The decomposition rate will be dependent upon the cell volume of contaminated liquid being treated, the type of contaminated liquid, the intensity of the light energy source and, when the process is being run on a continuous basis, the throughput or flow rate of the contaminated liquid through the cell.

The process of the present invention may be carried out at a relative humidity of from 5% to 100%.

It will be understood by one of skill in the art that the aforementioned process will be slightly modified when treating gaseous fluids. In a typical variation, a film of the catalyst will be deposited on a solid substrate, which will serve as the bottom or a sidewall of the photocatalytic reactor. The contaminated air or gaseous stream is passed over the layer of illuminated catalyst and the contaminants are degraded in the same way as in an aqueous system.

Optional process steps include the addition of ultrasonic energy or ozone to further enhance the efficiency of degradation.

Experimental Design and General Protocol

The experiments hereinafter employ the solid catalyst, either as an aqueous slurry which was fully coated onto a solid support material (such as the internal surface of the reaction cell wall); or as an aqueous slurry which was partly coated onto a solid support and partly dispersed in the fluid reaction medium; or as a suspension completely dispersed into the fluid reaction medium alone. There is no meaningful difference in the quality or quantity of reaction products obtained via the positioning of the solid catalyst.

All catalysts were characterized using Nicolet powder X-ray diffractometer equipped with a $CuK_a$ source to assess their crystallinity. MCM-41 powders were run from 2 to 7 degrees (2θ) to assess the crystallinity of the matrix and from 20 to 50 to assess the crystallinity of the $TiO_2$ loading. USY-based samples were run from 8 degrees to 50 degrees corresponding to both loading and support. Furthermore, the powders were characterized by UV-Vis Shimadzu 2501PC with an integrating sphere attachment ISR1200 for their diffuse reflectance in the range of wavelengths of 200 to 800 nm. BET and pore size distribution studies are being conducted (using Micromeritics Gemini apparatus) to characterize the synthesized MCM-41 and USY-2.6 samples.

The photocatalytic testing (photodegradation of phenol with an initial concentration of 2 mM) was performed in a batch quartz reactor (Ace Glass) using 450W UV-Visible mercury lamp with a UV filter transmitting about 0% of intensity at wavelengths below 380 nm. The suspended catalyst in aqueous system was mixed, oxygenated, and irradiated during each reaction run. The concentration of formic acid in the reactor was controlled using a thermal conductivity detector. Typical loading of the solid catalyst varied from 1–10 grams per liter of fluid reaction mixture.

The following examples are presented to further illustrate, but not to limit, the practice of the process of the invention:

EXAMPLE I

Transition metal substituted MCM-41 supports with Si/Me=80 and Si/Ti=40 were synthesized as described in co-pending U.S. Provisional Application Serial No. 60/144, 923 using Ludox HS-40 (DuPont) as the source of silica. The precursors incorporated in the framework of MGM were; chromia: $CrCl_3$ (Fisher); iron (III) oxide: $Fe_2O_3$; iron sulfate: $Fe_2(SO_4)_3$ (Fisher); titania: $Ti(OC_3H_7)_4$ (Aldrich). All samples were prepared in the presence of hexadecyltrimethylammoflium bromide (Fluka) as a template. The following is the typical preparation procedure: 35 grams of Ludox was added to 14.55 ml of water under stirring, and 18.2 ml of 40% tetramethylammonium hydroxide (Flulca) added. Independently, 18.25 g of the template was dissolved in 33 ml of water, and subsequently 7 ml of 28% $NH_4OH$ was introduced. Finally, the above two solutions containing Ludox and template were mixed together. The corresponding amounts of each precursor dissolved in either ethanol or water (depending on the nature of the precursor) were added drop-wise from a plastic syringe to the resulting mixture. The final mixture was stirred together for 30 minutes, then transferred into polypropylene bottle and treated under autogenous pressure without stirring at 90–100° C. for 3 days. The resulting solids were filtered, washed, dried, and calcined at 550° C. for 10 hours under airflow. The temperature profile was 2 degrees per minute up, 15 degrees per minute down. The rdsulting catalyst (typically 1.5 g) was dispersed in about 100 ml of isopropanol, and titanium isopropoxide was added to achieve 25% loading. The system was dried while stirring at ambient temperature. It was then placed in the oven to dry at 100° C. for 1 hour. They were then transferred into a boat-like crucible and calcined at 450° C. for 3 hours with a temperature ramp of 2 deg/min. The photocatalytic testing included the degradation of organic compounds, which was performed in a batch round (d=12 cm) flat-plate reactor using 200 W medium pressure mercury lamp (Ace Glass) as the light source. A 1 cm thick plexi-glass filter (US Plastics) was utilized for the purpose of removing ultraviolet radiation when conducting visible-light experiments ($\lambda$>420 nm). The cooling jacket around the reactor and around the lamp allowed for the effective removal of the IR part of the spectrum (heat). Before the reaction 0.5 L of the slurry (0.5 g/L of solids, 10 mM of formic acid, ambient pH) was ultrasonicated for 10 min in the ultrasonic bath in order to assure the breakage of catalyst aggregates. The suspended catalyst in aqueous system was oxygenated (Wright Bros, 99.9%) at 0.5 L/min to assure the complete saturation by oxygen and irradiated during each reaction run. The temperature in the reactor was kept constant at ~25° C., and the pH was not adjusted. The concentration of formic acid was tracked using a conductivity meter (VWR Scientific, cell constant 10 $cm^{-1}$). The latter device was pre-calibrated for the measurements by standard solutions of formic acid. Table 2. shows the results of the above experiments for the visible-light assisted degradation of formic acid in photocatalytic slurries.

TABLE 2

| Example | Catalyst | Conversion after 2 hours, % |
|---|---|---|
| 1 | $TiO_2$/Cr—Ti—MCM-41 | 31 |
| 2 | $TiO_2$/Fe—Ti—MCM-41 | 4 |

COMPARATIVE EXAMPLE 3

This example describes the degradation of formic acid as described in the previous example with the exception that a different photocatalyst, namely titanium dioxide Degussa P25 grade is used. A contaminated water sample containing a 10 millimolar concentration of formic acid was treated in the same manner as the samples treated in example 1. Degussa P25 TiO2 powdered catalyst, having a particle size of about 0.025 microns, was added to provide a concentration of about 0.025 wt % of catalyst, based on total weight of the solution, including the catalyst. When the sample was exposed to visible light ($\lambda$>420 nm) no degradation of formic acid was noted.

What is claimed is:

1. A process for the treatment of an aqueous liquid or gaseous fluid containing organic contaminants said process comprising the steps of:
   a) contacting the aqueous liquid or gaseous fluid with a semiconductor photocatalyst; wherein said semiconductor photocatalyst comprises a transition metal atom exchanged into the framework of a molecular sieve material and a photoactive semiconductor loaded onto the molecular sieve material; and
   b) exposing the aqueous liquid or gaseous fluid to visible light.

2. A process according to claim 1 wherein the transition metal atom is selected from the group consisting of chromium, iron, nickel, manganese, copper, tungsten, cobalt, molybdenum, ruthenium, vanadium, zinc, silver, platinum, titanium and mixtures thereof.

3. A process according to claim 1 wherein the process occurs at a relative humidity of from 5% to 100%.

4. The process of claim 1 wherein said molecular sieve material is a zeolite.

5. The process of claim 1 wherein said molecular sieve material is a mesoporous molecular sieve material.

6. The process of claim 1 wherein said liquid is exposed to light of wavelengths ranging from about 380 to about 750 nm.

7. The process of claim 1 wherein said semiconductor photocatalyst has an average particle size of from about 0.05 to about 1,000 microns.

8. The process of claim 1 wherein the intensity level of said light is at least about 1,000 microwatts/$in^2$ of exposure area per liter of liquid.

9. The process of claim 1 wherein said photoactive semiconductor is selected from the group consisting of titanium dioxide, zinc oxide, cadmium sulfide, iron oxide, gallium phosphide, tin oxide, silicon carbide, tungsten oxide and mixtures thereof.

10. The process of claim 1 wherein said semiconductor photocatalyst is a chromium-silica composite aerogel.

11. The process according to claim 1 wherein said exposure to visible light is generated in a modulated or pulsed manner including subsequent time-on and time-off intervals.

12. The process according to claim 11, wherein the modulated or pulsed light has a duty cycle, which has a ratio of light time to total time in the range of 5–50% and a light time less than 1 second.

13. The process according to claim 12 wherein the light time is less than 100 milliseconds.

14. The process according to claim 12 wherein the light time is less then 500 milliseconds.

15. The process according to claim 1 wherein step b) further comprises exposing the aqueous liquid or gaseous fluid to ozone.

16. The process according to claim 15 wherein the light time is less than 500 milliseconds.

17. The process according to claim 16 wherein the light time is less than 100 milliseconds.

18. The process according to claim 1 wherein step b) further comprises exposing the aqueous liquid or gaseous fluid to ultrasonic energy.

19. The process according to claim 1 wherein step b) further comprises exposing the aqueous liquid or gaseous fluid to ozone and ultrasonic energy.

20. A process for purifying an aqueous liquid or gaseous fluid containing organic contaminants by decomposing said contaminants said process comprising the steps of:
   a) mixing said aqueous liquid or gaseous fluid with a semiconductor photocatalyst to form a suspension of said semiconductor photocatalyst and said aqueous liquid or gaseous fluid having a concentration of from about 100 milligrams to about 2 grams of said semiconductor photocatalyst per liter of liquid or gas; wherein said semiconductor photocatalyst comprises a transition metal atom exchanged into the framework of a molecular sieve material and a photoactive semiconductor loaded onto the molecular sieve material; and
   b) exposing said suspension to visible light with a wavelength of from about 380 to about 750 nm; and
   c) separating said liquid or gas from said semiconductor photocatalyst after decomposition of said organic contaminants.

21. The process of claim 20 wherein the semiconductor photocatalyst has an average particle size of from about 0.05 to about 1,000 microns.

22. A process according to claim 20 wherein the transition metal atom is selected from the group consisting of chromium, iron, nickel, manganese, copper, tungsten, cobalt, molybdenum, ruthenium, vanadium, zinc, silver, platinum, titanium and mixtures thereof.

23. The process of claim 20 wherein said molecular sieve material is a zeolite.

24. The process of claim 20 wherein said molecular sieve material is a mesoporous molecular sieve material.

25. The process of claim 20 wherein said semiconductor photocatalyst is a chromium-silica composite aerogel.

26. The process according to claim 20 wherein said exposure to visible light is generated in a modulated or pulsed manner including subsequent time-on and time-off intervals.

27. The process according to claim 26 wherein the modulated or pulsed light has a duty cycle, defined as the ratio of light time to total time, in the range of 5–50% and with a light time of less than 1 second. humidity of from 5% to 100%.

28. The process of claim 20 wherein said photoactive semiconductor is selected from the group consisting of titanium dioxide, zinc oxide, cadmium sulfide, iron oxide, gallium phosphide, tin oxide, silicon carbide, tungsten oxide and mixtures thereof.

* * * * *

UNITED STATES PATENT AND TRADEMARK OFFICE
CERTIFICATE OF CORRECTION

PATENT NO. : 6,585,863 B2
DATED : July 1, 2003
INVENTOR(S) : Davydov et al.

It is certified that error appears in the above-identified patent and that said Letters Patent is hereby corrected as shown below:

<u>Title page,</u>
Item [73], Assignee, please add -- The University of Cincinnati, Cincinnati, Ohio --

Signed and Sealed this

Eleventh Day of May, 2004

JON W. DUDAS
*Acting Director of the United States Patent and Trademark Office*